(12) United States Patent
Remler et al.

(10) Patent No.: US 9,855,450 B2
(45) Date of Patent: Jan. 2, 2018

(54) SAFETY HARNESS ASSEMBLY

(71) Applicants: David Remler, Round Hill, VA (US); Ben Deckman, Round Hill, VA (US)

(72) Inventors: David Remler, Round Hill, VA (US); Ben Deckman, Round Hill, VA (US)

( * ) Notice: Subject to any disclaimer, the term of this patent is extended or adjusted under 35 U.S.C. 154(b) by 0 days.

(21) Appl. No.: 15/086,585

(22) Filed: Mar. 31, 2016

(65) Prior Publication Data
US 2016/0287917 A1    Oct. 6, 2016

Related U.S. Application Data

(60) Provisional application No. 62/142,832, filed on Apr. 3, 2015.

(51) Int. Cl.
| | | |
|---|---|---|
| A62B 35/00 | (2006.01) | |
| A41D 13/00 | (2006.01) | |
| A41D 13/02 | (2006.01) | |
| A41D 3/00 | (2006.01) | |
| A01M 31/02 | (2006.01) | |

(52) U.S. Cl.
CPC ...... A62B 35/0018 (2013.01); A41D 13/0007 (2013.01); A01M 31/02 (2013.01); A41D 3/00 (2013.01); A41D 13/02 (2013.01); A41D 2300/322 (2013.01)

(58) Field of Classification Search
CPC ..... A41D 13/0007; A41F 19/00; A62B 35/00; A62B 35/0018; A62B 35/0025
See application file for complete search history.

(56) References Cited

U.S. PATENT DOCUMENTS

| | | | | |
|---|---|---|---|---|
| 416,550 | A * | 12/1889 | Betten | A62B 35/0025 182/57 |
| 4,890,336 | A * | 1/1990 | Worton | A41D 13/02 2/79 |
| 5,716,307 | A * | 2/1998 | Vadher | A43B 7/20 482/124 |
| 5,738,046 | A | 4/1998 | Williams et al. | |
| 5,806,095 | A * | 9/1998 | Cotten | A41D 13/0007 2/227 |
| 5,970,517 | A * | 10/1999 | Jordan | A41D 13/0007 182/3 |
| 5,993,362 | A * | 11/1999 | Ghobadi | A63B 21/0004 482/121 |
| 6,101,631 | A * | 8/2000 | Ferguson, Jr. | A41D 13/0007 182/3 |
| 6,129,691 | A * | 10/2000 | Ruppert | A61F 5/026 128/845 |
| 6,256,789 | B1 | 7/2001 | Young et al. | |
| D457,965 | S * | 5/2002 | Firer | D24/190 |
| 6,428,495 | B1 * | 8/2002 | Lynott | A61F 5/3715 128/875 |

(Continued)

Primary Examiner — Colleen M Chavchavadze

(57) ABSTRACT

A safety harness assembly includes a jump suit that may be worn. The jump suit has an inner layer and an outer layer. A mesh is coupled to the jump and objects may be coupled to the mesh. A harness is coupled to the jump suit. Thus, the harness is worn when the jump suit is worn thereby facilitating the harness to be coupled around a user. The harness is positioned between the inner layer and the outer layer. A rope is coupled to the harness. The rope may be coupled to a stanchion thereby facilitating the harness to inhibit the user from falling off of a support on the stanchion.

8 Claims, 5 Drawing Sheets

(56) References Cited

U.S. PATENT DOCUMENTS

| | | | | |
|---|---|---|---|---|
| 6,450,131 B1* | 9/2002 | Broman | A61F 5/026 | 119/857 |
| 6,490,733 B1* | 12/2002 | Casaubon | A41D 13/0007 | 2/79 |
| 6,499,149 B2* | 12/2002 | Ashline | B60R 22/001 | 2/411 |
| 6,658,666 B2* | 12/2003 | Schweer | A41D 13/0007 | 182/3 |
| 6,813,782 B2* | 11/2004 | Kintzi | A42B 3/0473 | 2/421 |
| 6,839,909 B1* | 1/2005 | Prince | A41D 31/0072 | 2/69 |
| 6,871,360 B1* | 3/2005 | Ashline | B60R 22/001 | 2/411 |
| 6,892,395 B2* | 5/2005 | Schweer | A41D 13/0007 | 182/3 |
| 7,036,628 B2* | 5/2006 | Wilcox | A41D 13/0007 | 119/770 |
| 7,047,567 B2* | 5/2006 | Allen | A41D 13/0007 | 2/69 |
| 7,163,081 B2* | 1/2007 | Muhich | A62B 35/04 | 119/857 |
| 7,168,103 B2* | 1/2007 | Aldridge | A41D 13/02 | 2/458 |
| 7,594,281 B1* | 9/2009 | Stinson | A62B 17/003 | 2/310 |
| 7,735,150 B2* | 6/2010 | Wolfe | A41D 13/0007 | 2/69 |
| 7,744,511 B2* | 6/2010 | Grigoriev | A61F 5/0102 | 482/121 |
| 7,931,571 B2* | 4/2011 | Bernardoni | A61F 5/0102 | 434/255 |
| 7,971,273 B2* | 7/2011 | Grilliot | A41D 13/0007 | 2/227 |
| 8,056,675 B2* | 11/2011 | Helms | A62B 35/0018 | 182/134 |
| 8,088,088 B2* | 1/2012 | Hurley | A61F 5/026 | 119/857 |
| 8,091,151 B2* | 1/2012 | Johnson | A41D 13/0007 | 2/102 |
| D698,877 S * | 2/2014 | Calvin | A61F 5/0102 | D21/692 |
| 8,776,266 B1 | 7/2014 | Metz | | |
| 8,919,496 B2* | 12/2014 | Wolner | A62B 35/0006 | 182/3 |
| D725,825 S | 3/2015 | Seman et al. | | |
| 9,392,860 B2* | 7/2016 | Redli | A45F 3/04 | |
| 9,498,008 B2* | 11/2016 | Cherneski | A41D 13/0007 | |
| 2005/0230184 A1 | 10/2005 | Ansaldo | | |
| 2008/0156583 A1 | 7/2008 | Meeks | | |
| 2008/0282442 A1* | 11/2008 | Bauvois | A41D 13/0007 | 2/79 |
| 2008/0289903 A1 | 11/2008 | Kuhnert | | |
| 2015/0173346 A1 | 6/2015 | Bartolomucci | | |
| 2016/0270728 A1* | 9/2016 | McGinnis | A41D 13/0007 | |

* cited by examiner

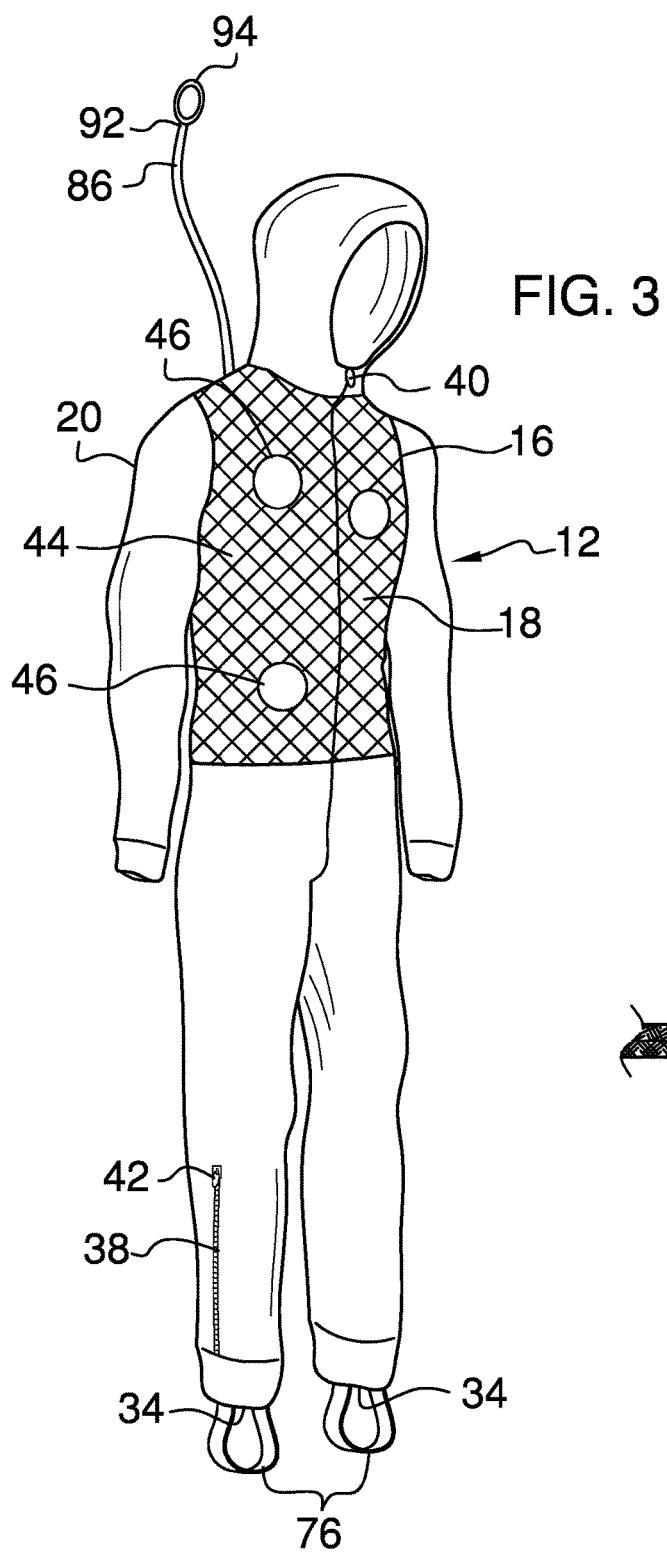
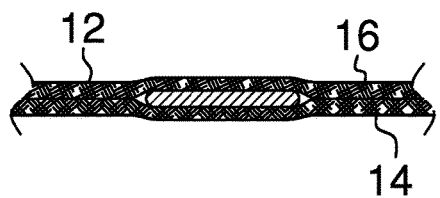

SAFETY HARNESS ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention
(2) Description of Related Art including information disclosed under 37 CFR 1.97 and 1.98.

The disclosure and prior art relates to harness devices and more particularly pertains to a new harness device for inhibiting a user from being injured when falling from a tree stand.

BRIEF SUMMARY OF THE INVENTION

An embodiment of the disclosure meets the needs presented above by generally comprising a jump suit that may be worn. The jump suit has an inner layer and an outer layer. A mesh is coupled to the jump and objects may be coupled to the mesh. A harness is coupled to the jump suit. Thus, the harness is worn when the jump suit is worn thereby facilitating the harness to be coupled around a user. The harness is positioned between the inner layer and the outer layer. A rope is coupled to the harness. The rope may be coupled to a stanchion thereby facilitating the harness to inhibit the user from falling off of a support on the stanchion.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a front perspective view of an embodiment of the disclosure.

FIG. 4 is a cross sectional view taken along line 4-4 of FIG. 2 of an embodiment of the disclosure.

DETAILED DESCRIPTION OF THE INVENTION

Figure 1:
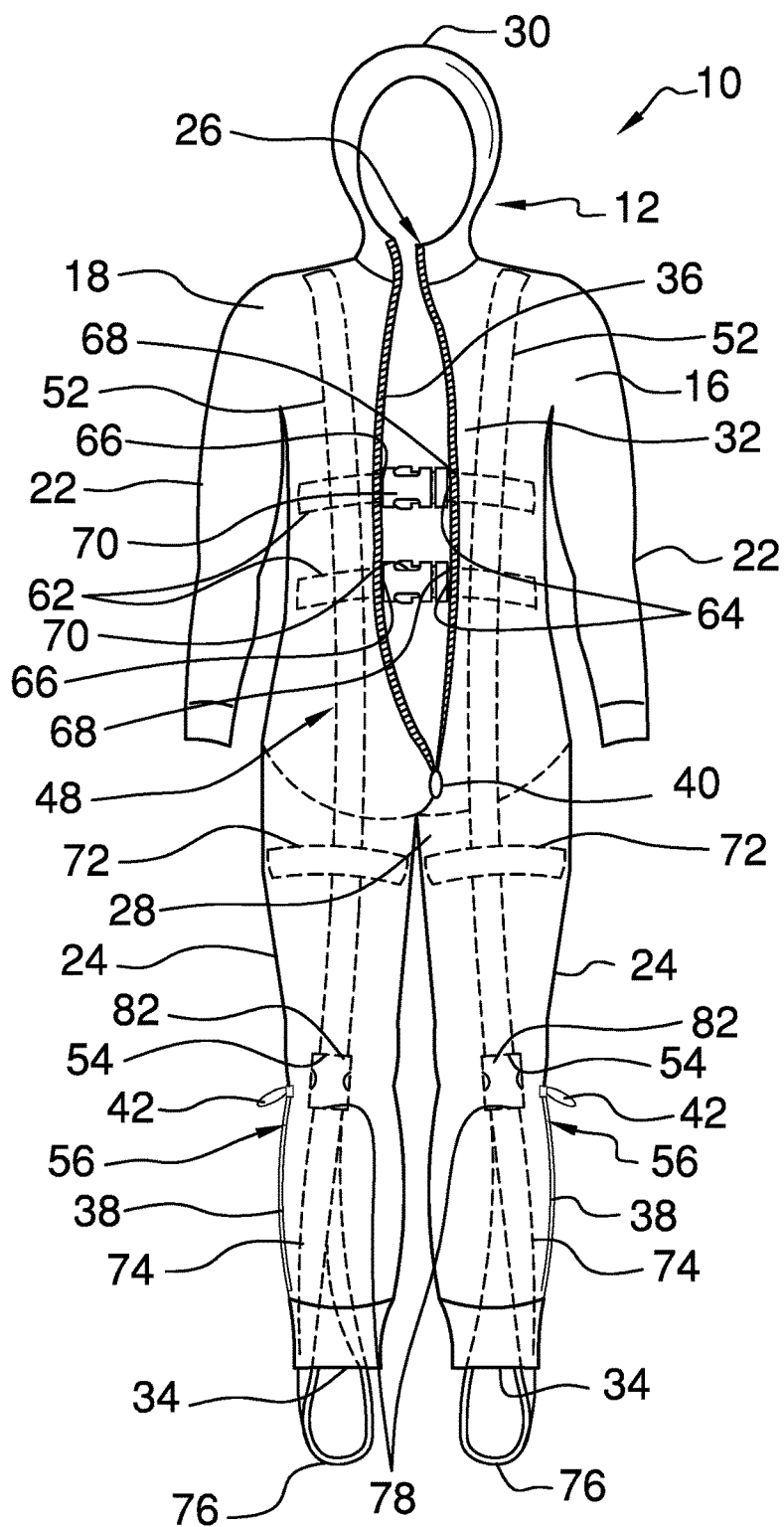
FIG. 1 is a front phantom view of a safety harness assembly according to an embodiment of the disclosure.
Figure 2:
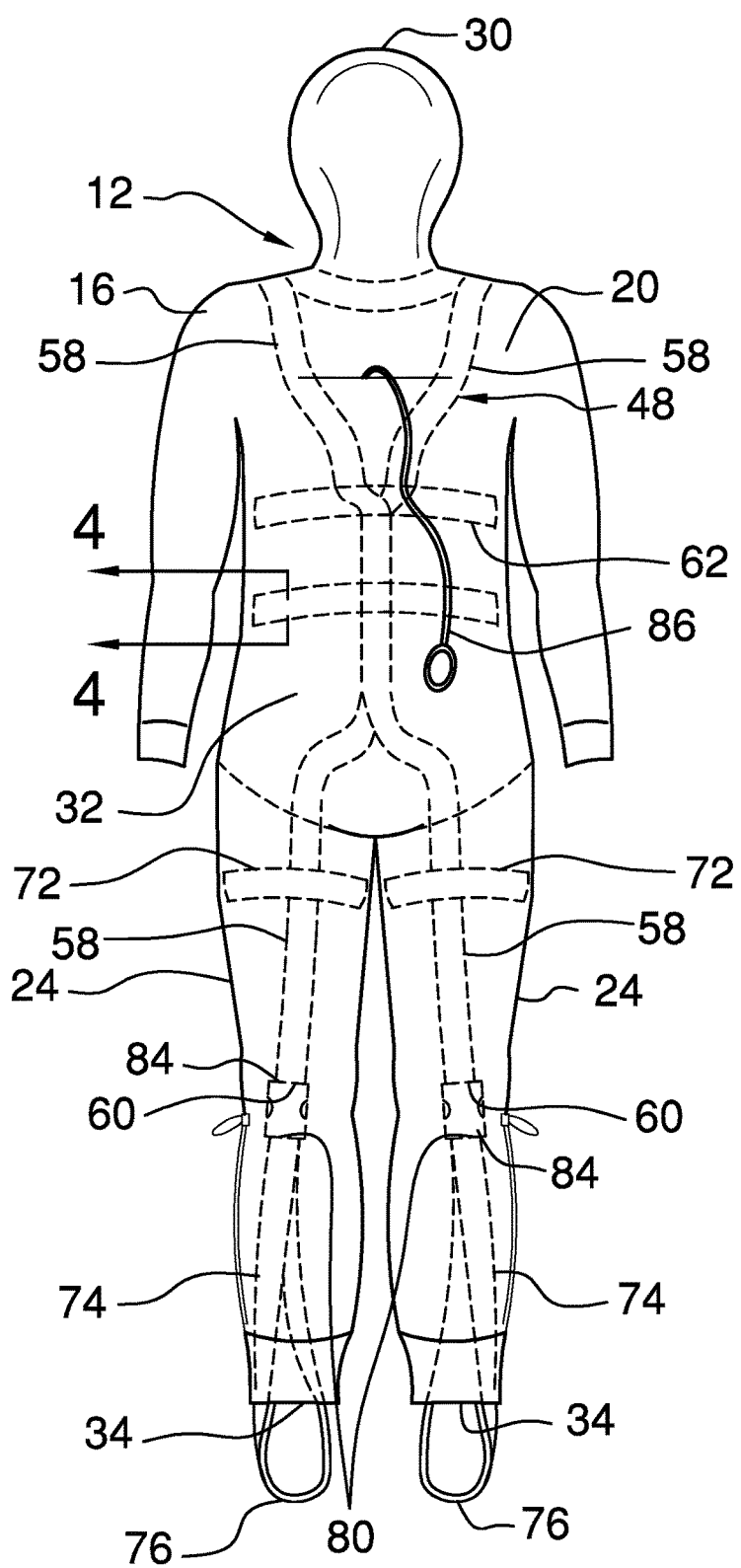
FIG. 2 is a back phantom view of an embodiment of the disclosure.
Figure 5:
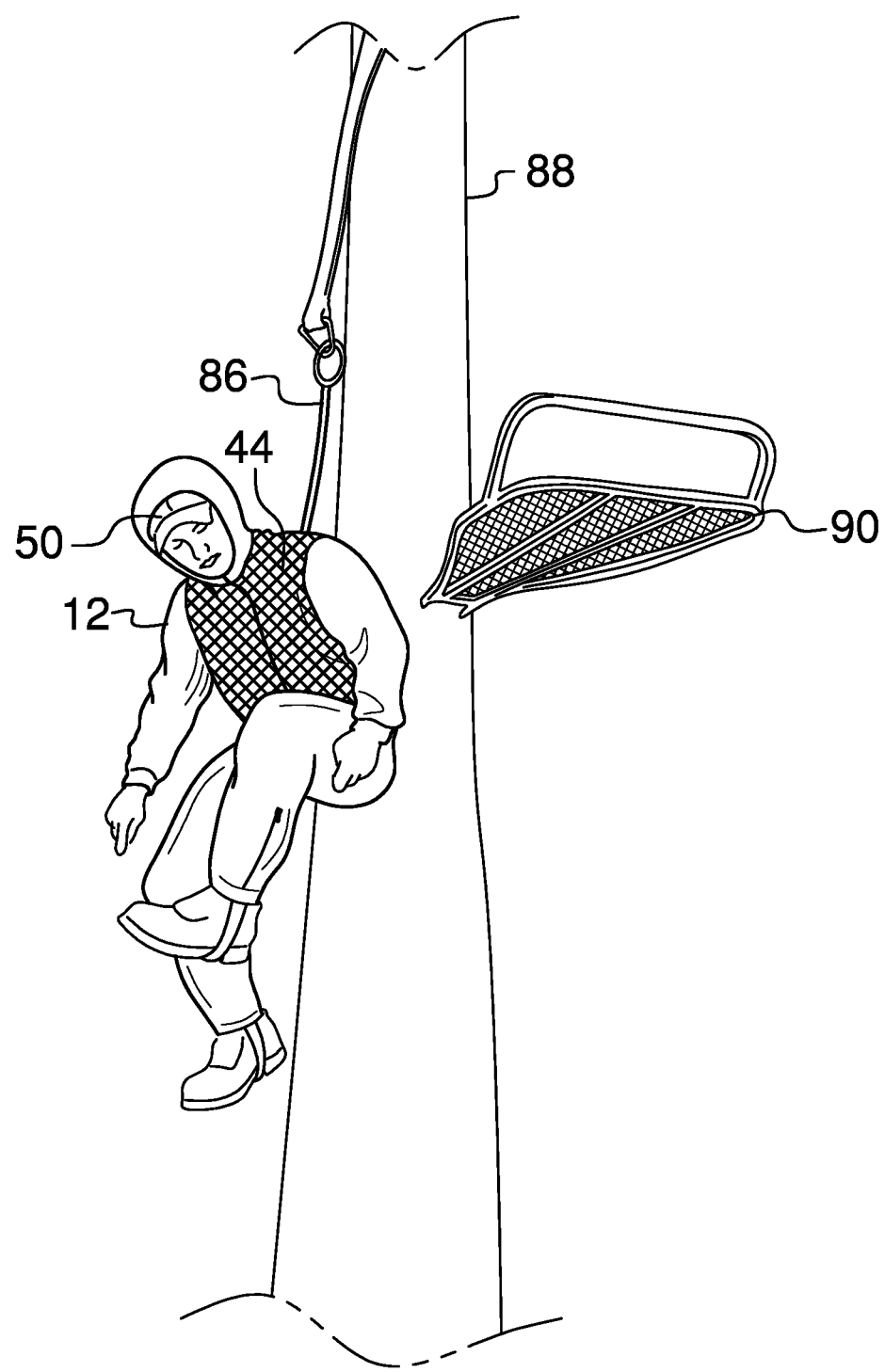
FIG. 5 is a perspective in-use view of an embodiment of the disclosure.

With reference now to the drawings, and in particular to FIGS. 1 through 7 thereof, a new harness device embodying the principles and concepts of an embodiment of the disclosure and generally designated by the reference numeral 10 will be described.

As best illustrated in FIGS. 1 through 7, the safety harness assembly 10 generally comprises a jump suit 12 that may be worn. The jump suit 12 has an inner layer 14, an outer layer 16, a front side 18 and a back side 20. The jump suit 12 has a pair of arms 22, a pair of legs 24, a neck opening 26, a crotch 28, a hood 30 and a body 32. Each of the pair of legs 24 has an open end 34 and the front side 18 has a first cut 36 extending downwardly from the neck opening 26 toward the crotch 28. Each of the legs 24 has a second cut 38 extending upwardly from the open end 34 of the legs 24.

A first closure 40 is coupled to the jump suit 12 and the first closure 40 may be manipulated. The first closure 40 is aligned with the first cut 36 such that the first closure 40 selectively closes the first cut 36. The first closure 40 may comprise a zipper or the like. A pair of second closures 42 is provided. Each of the second closures 42 is coupled to the jump suit 12 and each of the second closures 42 may be manipulated. Each of the second closures 42 is aligned with the second cut 38 corresponding to an associated one of the legs 24. Thus, each of the second closures 42 selectively closes the associated second cut 38 and each of the second closures 42 may comprise a zipper or the like.

A mesh 44 is coupled to the jump suit 12. Objects 46 may be coupled to the mesh 44 thereby facilitating the objects 46 to be coupled to the jump suit 12. The mesh 44 is positioned on the outer layer 16 corresponding to the body 32. The objects 46 may be camouflage or other objects used in the convention of hunting.

A harness 48 is coupled to the jump suit 12. The harness 48 is worn when the jump suit 12 is worn. Thus, the harness 48 is coupled around a user 50 when the user 50 wears the jump suit 12. The harness 48 is positioned between the inner layer 14 and the outer layer 16.

The harness 48 comprises a pair of first straps 52. Each of the first straps 52 extends longitudinally along the body 32 and each of the legs 24. Each of the first straps 52 extends along the front side 18 of the jump suit 12 and the first straps 52 are spaced apart from each other. Each of the first straps 52 has a bottom end 54. The bottom end 54 is aligned with a knee 56 of an associated one of the legs 24.

A pair of second straps 58 is provided and each of the second straps 58 extends longitudinally along the body 32 and each of the legs 24. Each of the second straps 58 extends along the back side 20 of the jump suit 12 and the second straps 58 are spaced apart from each other. Each of the second straps 58 has a lower end 60 and the lower end 60 is aligned with the knee 56 of an associated one of the legs 24. Each of the second straps 58 is coupled to an associated one of the first straps 52 adjacent to a shoulder of the jump suit 12. Thus, the harness 48 extends over the user's shoulders when the user 50 wears the jump suit 12.

A plurality of body straps 62 is provided and each of the body straps 62 is laterally oriented in the body 32 of the jump suit 12. The body straps 62 are spaced apart from each other. Each of the body straps 62 is coupled between each of the first straps 52 and each of the second straps 58. Thus, each of the body straps 62 may wrap around the user's torso when the user 12 wears the jump suit 12. Each of the body straps 62 has a cut 64 to define a first end 66 and a second end 68 of each of the body straps 62.

The cut 64 corresponding to each of the body straps 62 is aligned with the cut 64 in the jump suit 12. The first end 66 corresponding to each of the body straps 62 is matable to the second end 68 of an associated body strap 62. A pair of first fasteners 70 is removably coupled between the first end 66 and the second end 68 of the associated body straps 62. Each of the first fasteners 70 may comprise a pair of complementary clips or the like.

A pair of leg straps 72 is provided and each of the leg straps 72 is laterally oriented in an associated one of the legs 24 of the jump suit 12. Thus, each of the legs 24 straps wraps around an associated one of the user's legs when the user 50 wears the jump suit 12. Each of the legs straps 72 is coupled between the first strap 52 and the second strap 58 corresponding to the associated leg 24. Each of the legs straps 72 may wrap around the user's thighs.

A pair of foot straps 74 is provided and each of the foot straps 74 is longitudinally oriented in an associated one of the legs 24. Each of the foot straps 74 extends along the front side 18 and the back side 20 corresponding to the associated leg 24. Each of the foot straps 74 extends outwardly from the open end 34 of the associated leg 24. Thus, each of the foot straps 74 forms a loop 76 on the associated leg 24. The loop 76 on each foot strap 74 engages an associated one of the user's feet when the user 50 wears the jump suit 12.

Each of the foot straps 74 has a primary end 78 and a secondary end 80. The primary end 78 corresponding to each of the foot straps 74 is matable to the bottom end 54 of an associated first strap 52. The secondary end 80 corresponding to each of the foot straps 74 is matable to the lower end 60 of an associated second strap 58.

A pair of second fasteners 82 is provided. Each of the second fasteners 82 is coupled between an associated foot strap 74 and the associated first strap 52. A pair of third fasteners 84 is provided. Each of the third fasteners 84 is coupled between an associated foot strap 74 and the associated second strap 52. Each second fasteners 82 and each of the third fasteners 84 may comprise a pair of complementary clips or the like.

A rope 86 is coupled to the harness 48 and the rope 86 may be coupled to a stanchion 88. Thus, the harness 48 inhibits the user 50 from falling off of a support 90 on the stanchion 88. The stanchion 88 may be a tree or the like. The support 90 may be a tree stand or the like. The rope 86 extends outwardly from the back side 20 of the jump suit 12 corresponding to the body 32. The rope 86 has a distal end 92 with respect to the jump suit 12.

Figure 6:
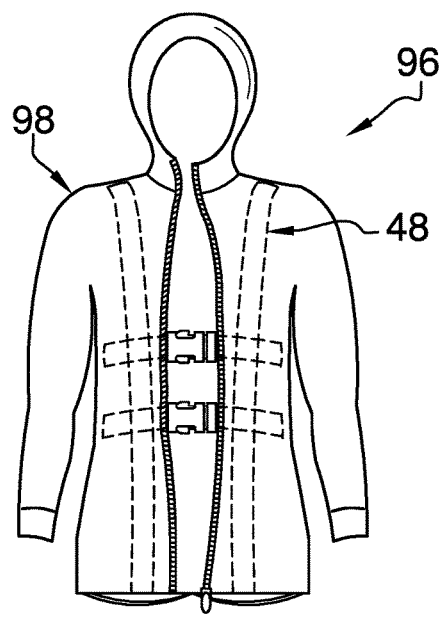
FIG. 6 is a front view of an alternative embodiment of the disclosure.
Figure 7:
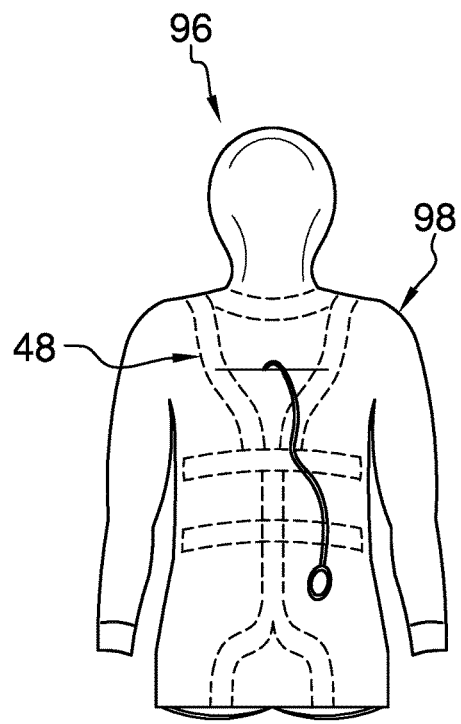
FIG. 7 is a back view of an alternative embodiment of the disclosure.

A ring 94 is coupled to the distal end 92 and the ring 94 may be removably coupled to the stanchion 88. The rope 86 may be comprised of a resiliently stretchable material. In an alternative embodiment 96 as shown in FIGS. 6 and 7, a jacket 98 may be provided and the jacket 98 may be worn. The harness 48 may be coupled to the jacket 98. Thus, the harness 48 is worn when the jacket 98 is worn.

In use, the jump suit 12 is worn when the user 50 is hunting from a tree stand. Each of the leg straps 72 is coupled to the associated first 52 and second 58 straps. The user 50 dons the jump suit 12 and each of the user's feet is positioned in the loop 76 of an associated leg strap 72. Each of the first fasteners 70 is manipulated to couple the body straps 62 around the user's body. The ring 94 is coupled to the stanchion 88 when the user 50 stands on the support 90. Thus, the rope 86 inhibits the user 50 from falling to ground when the user 50 falls from the support 90.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A safety harness assembly being configured to inhibit a hunter from falling out of a tree stand, said assembly comprising:

a jump suit being configured to be worn, said jump suit having an inner layer and an outer layer, said jump suit having a front side and a back side, said jump suit having a pair of arms, a pair of legs, a neck opening, a crotch, a hood and a body, each of said pair of legs having an open end, said front side having a first cut extending downwardly from said neck opening toward said crotch, each of said legs having a second cut extending upwardly from said open end of said legs;

a mesh being coupled to said jump suit wherein said mesh is configured to have objects coupled thereto thereby facilitating the objects to be coupled to said jump suit;

a harness being coupled to said jump suit wherein said harness is configured to be worn when said jump suit is worn thereby facilitating said harness to be coupled around a user, said harness being positioned between said inner layer and said outer layer, said harness including a pair of first straps, each of said first straps extending longitudinally along said body and a respective one of each of said legs, each of said first straps extending along said front side of said jump suit, said first straps being spaced apart from each other, each of said first straps having a bottom end, said bottom end of each of said first straps being aligned with a knee of an associated one of said legs of said jump suit, said harness including a pair of second straps, each of said second straps extending longitudinally along said body and an associated one of said legs of said jump suit, each of said second straps extending along said back side of said jump suit, each of said second straps having a lower end, said lower end of each of said second straps being aligned with a knee of said associated one of said legs of said jump suit, each of said second straps being coupled to an associated one of said first straps such that each of said first straps and said second straps is configured to extend over the user's shoulders when the user wears said jump suit, said harness including a pair of foot straps, each of said foot straps being longitudinally oriented in an associated one of said legs, each of said foot straps extending along said front side and said back side corresponding to said associated leg, each of said foot straps extending outwardly from said open end of said associated leg to form a loop on said associated leg wherein said loop is configured to engage an associated one of the user's feet when the user wears said jump suit, each of said foot straps having a primary end and a secondary end, said primary end corresponding to each of said foot straps being matable to said bottom end of an associated first strap, said secondary end corresponding to each of said foot straps being matable to said lower end of an associated second strap; and a rope being coupled to said harness wherein said rope is configured to be coupled to a stanchion thereby facilitating said harness to inhibit the user from falling off of a support on the stanchion.

2. The assembly according to claim 1, further comprising a first closure being coupled to said jump suit wherein said first closure is configured to be manipulated, said first closure being aligned with said first cut such that said first closure selectively closes said first cut.

3. The assembly according to claim 1, further comprising a pair of second closures, each of said second closures being coupled to said jump suit wherein each of said second closures is configured to be manipulated, each of said second closures being aligned with said second cut corresponding to an associated one of said legs such that each of said second closures selectively closes said associated second cut.

4. The assembly according to claim 1, further comprising a plurality of body straps, each of said body straps being laterally oriented in said body of said jump suit, said body straps being spaced apart from each other, each of said body straps being coupled between each of said first straps and each of said second straps wherein each of said body straps is configured to wrap around the user's torso when the user wears said jump suit, each of said body straps having a cut to define a first end and a second end of each of said body straps, said cut corresponding to each of said body straps being aligned with said first cut in said jump suit, said first end corresponding to each of said body straps being matable to said second end of an associated body strap.

5. The assembly according to claim 1, further comprising a pair of leg straps, each of said leg straps being laterally oriented in an associated one of said legs of said jump suit wherein each of said legs straps is configured to wrap around an associated one of the user's legs when the user wears said jumpsuit, each of said legs straps being coupled between said first strap and said second strap corresponding to said associated leg.

6. The assembly according to claim 1, wherein said rope extends outwardly from said back side of said jump suit, said rope having a distal end with respect to said jump suit.

7. The assembly according to claim 6, further comprising a ring being coupled to said distal end wherein said ring is configured to be removably coupled to the stanchion.

8. A safety harness assembly being configured to inhibit a hunter from falling out of a tree stand, said assembly comprising:

a jump suit being configured to be worn, said jump suit having an inner layer, an outer layer, a front side and a back side, said jump suit having a pair of arms, a pair of legs, a neck opening, a crotch, a hood and a body, each of said pair of legs having an open end, said front side having a first cut extending downwardly from said neck opening toward said crotch, each of said legs having a second cut extending upwardly from said open end of said legs;

a first closure being coupled to said jump suit wherein said first closure is configured to be manipulated, said first closure being aligned with said first cut such that said first closure selectively closes said first cut;

a pair of second closures, each of said second closures being coupled to said jump suit wherein each of said second closures is configured to be manipulated, each of said second closures being aligned with said second cut corresponding to an associated one of said legs such that each of said second closures selectively closes said associated second cut;

a mesh being coupled to said jump suit wherein said mesh is configured to have objects coupled thereto thereby facilitating the objects to be coupled to said jump suit, said mesh being positioned on said outer layer corresponding to said body;

a harness being coupled to said jump suit wherein said harness is configured to be worn when said jump suit is worn thereby facilitating said harness to be coupled around a user, said harness being positioned between said inner layer and said outer layer, said harness comprising:

a pair of first straps, each of said first straps extending longitudinally along said body and a respective one of each of said legs, each of said first straps extending along said front side of said jump suit, said first straps being spaced apart from each other, each of said first straps having a bottom end, said bottom end of each of said first straps being aligned with a knee of an associated one of said legs of said jump suit, a pair of second straps, each of said second straps extending longitudinally along said body and an associated one of each of said legs, each of said second straps extending along said back side of said jump suit, each of said second straps having a lower end, said lower end of each of said second straps being aligned with a knee of said associated one of said legs of said jump suit, each of said second straps being coupled to an associated one of said first straps such that each of said first straps and said second straps is configured to extend over the user's shoulders when the user wears said jump suit, a plurality of body straps, each of said body straps being laterally oriented in said body of said jump suit, said body straps being spaced apart from each other, each of said body straps being coupled between each of said first straps and each of said second straps wherein each of said body straps is configured to wrap around the user's torso when the user wears said jump suit, each of said body straps having a cut to define a first end and a second end of each of said body straps, said cut corresponding to each of said body straps being aligned with said cut in said jump suit, said first end corresponding to each of said body straps being matable to said second end of an associated body strap, a pair of leg straps, each of said leg straps being laterally oriented in an associated one of said legs of said jump suit wherein each of said legs straps is configured to wrap around an associated one of the user's legs when the user wears said jumpsuit, each of said legs straps being coupled between said first strap and said second strap corresponding to said associate leg, a pair of foot straps, each of said foot straps being longitudinally oriented in an associated one of said legs, each of said foot straps extending along said front side and said back side corresponding to said associated leg, each of said foot straps extending outwardly from said open end of said associated leg to form a loop on said associated leg wherein said loop is configured to engage an associated one of the user's feet when the user wears said jump suit, each of said foot straps having a primary end and a secondary end, said primary end corresponding to each of said foot straps being matable to said bottom end of an associated first strap, said secondary end corresponding to each of said foot straps being matable to said lower end of an associated second strap;

a rope being coupled to said harness wherein said rope is configured to be coupled to a stanchion thereby facilitating said harness to inhibit the user from falling off of a support on the stanchion, said rope extending outwardly from said back side of said jump suit, said rope having a distal end with respect to said jump suit; and a ring being coupled to said distal end wherein said ring is configured to be removably coupled to the stanchion.

* * * * *